INVENTOR
Duncan J. Stewart & George Forrest Drake
BY
Parker, Carlson, Pitzner & Hubbard.
ATTORNEYS Patented June 24, 1941

2,246,550

UNITED STATES PATENT OFFICE 2,246,550

CONTROL FOR CONDITIONING SYSTEMS

Duncan J. Stewart and George Forrest Drake, Rockford, Ill., assignors to Barber Colman Company, Rockford, Ill., a corporation of Illinois Application March 18, 1938, Serial No. 196,658

19 Claims. (Cl. 257—3)

This invention relates to controls for conditioning systems and more particularly to those of the so-called reversing or modulating type in which the flow of a conditioning medium is governed by a plurality of regulating members such, for example, as valve devices moved successively by the action of a single control instrument.

The primary object of this invention is to improve the accuracy of control obtainable with systems of the above general character.

A more detailed object is to provide, in such a system, a novel mechanism for varying the control point of the controlling instrument progressively in accordance with cumulative movements of the regulating members.

Another object is to provide a control of the above character in which the regulating members are modulated through spaced portions of the range of proportioning action of the controlling mechanism.

A further object is to provide a control system of the above character which is especially adapted for the control of a heater and an artificial cooler to effect automatic year-round operation thereof in an air conditioning system.

The invention also resides in the novel structural character of the mechanism for carrying out the foregoing objects.

Other objects and advantages of the invention will become apparent from the following detailed description taken in connection with the accompanying drawings, in which Figure 1 is a schematic view and wiring diagram of an exemplary air conditioning system embodying the novel features of the present invention.

Figure 1:
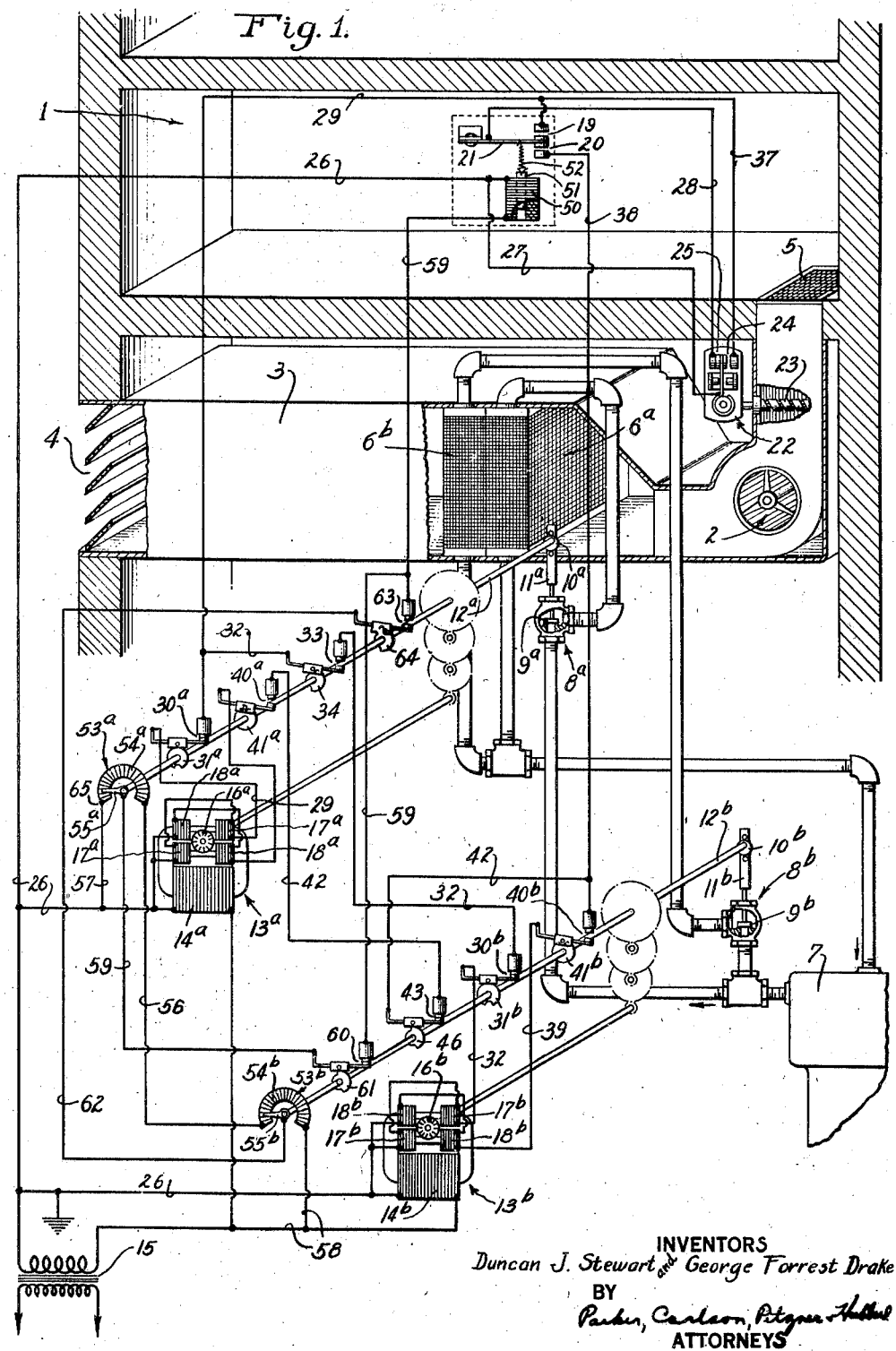

While the invention is shown in the drawings and will be described herein as applied to a heating and ventilating system of a particular type, it is to be understood that the invention is applicable equally well to other types of condition control systems and that we do not intend to limit the invention by such disclosure but aim to cover all modifications and alternative constructions falling within the spirit and scope of the invention as expressed in the appended claims.

Referring first to the exemplary system shown in Fig. 1, air which constitutes the conditioning medium is forced into the room or space 1 to be conditioned by a power driven blower 2 which draws air through a duct 3 having an intake 4 and an outlet 5. Within the duct, the air comes in contact with a bank of heaters $6^a$ and $6^b$ which, in the present instance, are in the form of coils or radiators supplied with heating fluid such as steam from a common source of supply 7.

The amount of heat imparted to the air by the combined action of the heaters is determined by the positions of regulating devices in the form of valves $8^a$ and $8^b$ interposed in the supply lines leading to the respective heaters. The members 9 of the valves are arranged to be moved toward and away from the valve seats by individual power driven operators capable of moving the respective valve members varying distances back and forth thereby throttling the admission of the heating medium to determine the effective heating capacities of the heater coils.

The operator for the valve $8^a$ comprises a cam $10^a$ shaped to impart reciprocatory motion to the valve stem $11^a$ during rotation of an actuating member comprising an operating shaft $12^a$ driven through speed reducing gearing by an electric motor $13^a$. Herein the motor is of the shaded pole induction type having a main winding $14^a$ constantly energized from a source 15 of alternating current. Shading coils are arranged in pairs $17^a$ and $18^a$ around the rotor $16^a$ and adapted when short-circuited to cause the rotor to turn counter-clockwise and clockwise respectively thereby opening and closing the valve. When both sets of shading coils are open-circuited, the position of the valve will be maintained by its operator. The operator for the valve $8^b$ is similarly constructed and the parts thereof are numbered correspondingly.

Since the temperature of the air within the building is the condition being controlled in the present instance, changes in this condition may be detected by a suitable thermostat located in the space being conditioned. Herein, the thermostat comprises a strip 21 of thermostatic metal which moves in opposite directions to operate switches 19 and 20 in accordance with the heating requirements as determined by the temperature in the space 1. The switch 19 is closed when the space temperature falls below the effective control point or instantaneous setting of the thermostat, the switch 20 being closed by a rise in space temperature above this point. Both switches are open when the element temperature coincides with the prevailing control point of the thermostat.

A duct thermostat 22 may be employed to insure that the temperature of the air delivered to the room will always be above a predetermined minimum value regardless of the condition of the room thermostat. This thermostat is of the so-called detent type and comprises an element 23 disposed within the duct 3 near the outlet 5 and having a switch 24 which is closed when the duct temperature falls below the minimum limit. A switch 25 is closed above this limit temperature and operates to render the switch 20 of the main thermostat ineffectual when the duct thermostat is calling for heat.

Transfer of the control by the room thermostat from one valve operator to the other to effect progressive opening or closing of the valves in successive order is accomplished by arranging the motor coils 17a and 17b in parallel branches of a circuit which includes the room thermostat switch 19 and similarly placing the coils 18a and 18b in parallel branches of a circuit including the thermostat switch 20. The shading coil windings of each motor are made electrically common and each common terminal is connected to the thermostat tongue 21 by conductors 26 and 27, the switch 25 of the duct thermostat and a conductor 28.

The insulated contact of the switch 19 is connected to the winding 17a by a conductor 29 having a switch 30a interposed therein and arranged to be controlled by a cam 31a on the operator shaft 12a so as to be closed when the valve 8a is closed or partially closed but to be opened when the valve reaches fully open position. The switch 30a thus determines the limit to which the valve member 8a may be opened by its operator.

In parallel with the switch 30a and the winding 17a is a conductor 32 leading to the winding 17b and having therein a switch 33 actuated by a cam 34 on the shaft 12a and closed thereby when the valve 8a is fully opened but maintained open for all other positions of this valve. The conductor 32 leads to the winding 17b through a limit switch 30b which is held closed by a cam 31b except when the shaft 12b reaches valve open position whereupon the switch will be opened. With this arrangement, it will be seen that the switch 19 is arranged to control the opening of both of the valves 8b and 8a and that the control by this switch is transferred from the operator of the valve 8a to the operator of the valve 8b when the shaft of the former reaches fully open position.

The stationary contact of the duct thermostat switch 24 is connected by a conductor 37 to the stationary contact of the switch 19. The switch 24 is thus connected in parallel with the switches 19 and 25 and operates to control the opening of the two valves in the same way.

The stationary contact of the room thermostat switch 20 extends to the valve closing windings 18b and 18a through a conductor 38 and parallel branch circuits one leading to the windings 18b through a conductor 39 having interposed therein a limit switch 40b which is held closed by a cam 41b except when the shaft 12b is in valve closed position. The other branch circuit extends through a conductor 42 which includes two switches 43 and 40a, the latter being maintained closed by a cam 41a except when the valve 8a is fully closed. The switch 43 serves to transfer the control of the switch 20 from the motor 13b to the motor 13a as the valve 8b becomes fully closed. This is accomplished by a cam 46 on the shaft 12b operating to maintain the switch 43 open until the valve 8b becomes fully closed.

With the arrangement of transfer and limit switches above described, the operator whose valve is partially opened will always be under the control of the room thermostat. If both valves are open, the motor 13b will be the first to be started by closure of the thermostat switch 20, while the valve 8a is the first to be opened when the thermostat switch 19 is closed with both of the valves closed. In the event that the thermostat ceases to call for heat when one of the valves is being opened, the operator then under the control of the thermostat will maintain the intermediate position of the valve so long as both of the thermostat switches remain open. The valve may subsequently be moved in either direction depending on which of the switches 19 and 20 is next closed. In this way, the capacity of one heater is varied progressively in accordance with the demands on the system as determined by the room thermostat until its maximum capacity has been reached whereupon the capacity of the second heater is varied progressively according to the increased demands while the first heater continues to operate at full capacity. The combined heating effect of the radiators thus becomes adjusted automatically and accurately to meet the heating requirements.

To improve the accuracy of room temperature regulation in a system of the general character above described, the present invention contemplates the provision of means which operates automatically throughout the entire range of cumulative movements of the several regulating devices to anticipate a change in the room temperature resulting from heat-increasing or heat-decreasing movement of either valve device and causes such movement to be arrested before the heat supply has been increased or decreased more than is necessary in order to effect the required temperature change. The means illustrated herein for this purpose operates to progressively decrease the effective control point of the room thermostat through a narrow temperature range, for example three degrees, in accordance with the cumulative opening movements of the two valves and to increase the thermostat control point progressively as the valves 8b and 8a close successively.

Preferably, the thermostatic adjusting means is an independent power actuated device associated with the thermostat and controlled in a manner such as to act approximately instantaneously in response to a change in the position of either of the valves. In the present instance, the power actuated device includes a solenoid 50 having an armature 51 connected to the thermostatic element 21 of the room thermostat through the medium of a light contractile spring 52. With this arrangement, the tension imposed upon the element 21 and therefore the control point of the thermostat is dependent upon the degree of energization of the solenoid.

Energization of the solenoid 50 is, in the present instance, governed by two voltage regulators in the form of rheostats 53a and 53b respectively operated from the valve operator shafts $12^a$ and $12^b$. The rheostats comprise resistance elements $54^a$ and $54^b$ engaged by contact arms $55^a$ and $55^b$ fast on the valve operator shafts. Preferably, the rheostats are of the potential dividing type, and for this purpose, the two resistance elements are connected in series relation by a conductor 56, the other terminals of the resistance elements being connected to the low voltage current source 15 by conductors 26, 57, and 58.

One terminal of the solenoid is connected to the rheostat element $54^a$ by conductors 26 and 57. The other terminal is arranged to be connected selectively according to the positions of the valves $8^a$ and $8^b$ to either one or both of the rheostat contact arms $55^a$ and $55^b$. To this end, the connection with the arm $55^a$ is through a conductor 59 having interposed therein a switch 60 which is actuated by a cam 61 and maintained closed when the valve $8^b$ is closed but is opened in the initial opening movement of this valve. A branch circuit extends from the conductor 59 to the arm $55^b$ through a conductor 62 having interposed therein a switch 63 which is held open until the valve $8^a$ becomes fully opened whereupon the switch is closed by a cam 64 on the shaft $12^a$.

The operation of the rheostats in controlling the energization of the solenoid 50 is as follows: When both of the valves $8^a$ and $8^b$ are closed as shown in Fig. 1, the solenoid will be energized by the minimum voltage determined by the potential drop across that portion of the resistance element $54^a$ between the arm $55^a$ and the terminal 65. As the valve $8^a$ opens, the arm $55^a$ will swing clockwise across the element $54^a$ thereby progressively increasing the voltage applied to the solenoid, the total range of voltage variation by movement of the valve $8^a$ being determined by the drop across the entire element $54^a$.

As an incident to complete opening of the valve $8^a$ and the subsequent initial opening of the valve $8^b$ during a continued call of the room thermostat for heat, the solenoid is connected to both rheostat arms $55^a$ and $55^b$ during the interval between the closing of the switch 63 as the valve $8^a$ reaches fully open position and opening of the switch 60 as the valve $8^b$ starts to open. Then, the solenoid is disconnected from the arm $55^a$ by opening of the switch 60 as the valve $8^b$ starts to open. If the thermostat continues to call for heat, energization of the solenoid will increase progressively as the arm $55^b$ moves across the element $54^b$. The voltage applied to the solenoid at any time when the valve $8^b$ is partially open will be determined by the voltage drop across the element $54^a$ combined with the drop across that portion of the element between the terminal 66 and the arm $55^b$. Thus, the degree of energization of the solenoid 50 corresponds at all times to the combined opening of the two valves.

Figure 3:
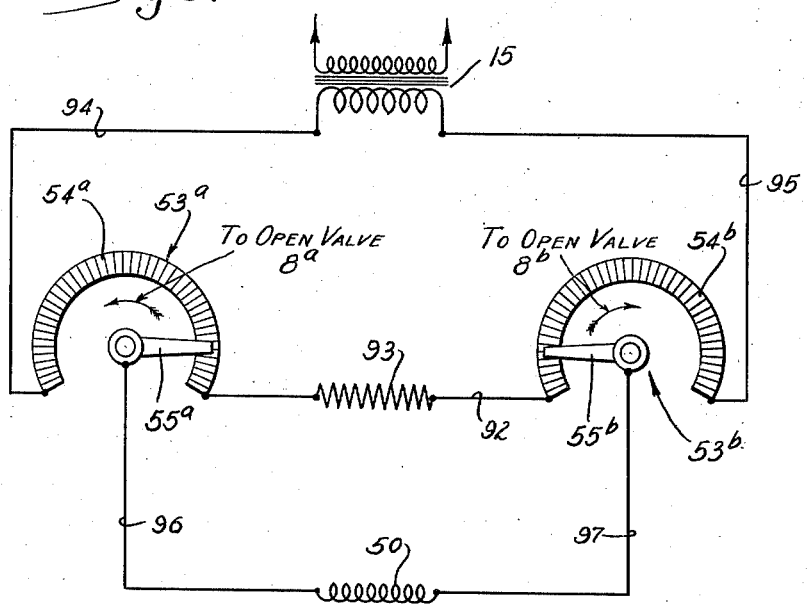
Fig. 3 is a wiring diagram of a modification of the control shown in Fig. 1.

Fig. 3 shows a modified circuit arrangement illustrating how the rheostats $53^a$ and $53^b$ may be utilized to vary the energization of the solenoid 50 throughout the cumulative range of movement of the two valves $8^a$ and $8^b$ while at the same time avoiding the use of several cam operated switches. In this instance the terminal ends of the resistance elements $54^a$ and $54^b$ which are engaged by the contact arms $55^a$ and $55^b$ in the closed positions of the respective valves are connected by a conductor 92 having a fixed resistance 93 interposed therein. The other terminals of the resistance elements are joined to the power source 15 by conductors 94 and 95 and the terminals of the solenoid are directly connected by conductors 96 and 97 to the arms $55^a$ and $55^b$ respectively.

With this arrangement, the voltage applied to the solenoid when both valves are closed as shown will be equal to the drop across the resistor 93. As the valve $8^a$ opens swinging the arm $55^a$ counter-clockwise, increasing portions of the resistance $54^a$ will be included in the solenoid circuit thereby increasing the applied voltage and the degree of energization of the solenoid, all of the resistance $54^a$ being included when the valve $8^a$ becomes fully open. Then as the valve $8^b$ starts to open, the voltage applied to the solenoid will be determined by the combined potential drop across the resistance $54^a$, the fixed resistance 93, and a portion of the resistance $54^b$. The maximum voltage will be that of the power source and will occur when both of the valves are fully open. As the valves $8^b$ and $8^a$ close successively, the energization of the solenoid will decrease progressively.

Figure 2:
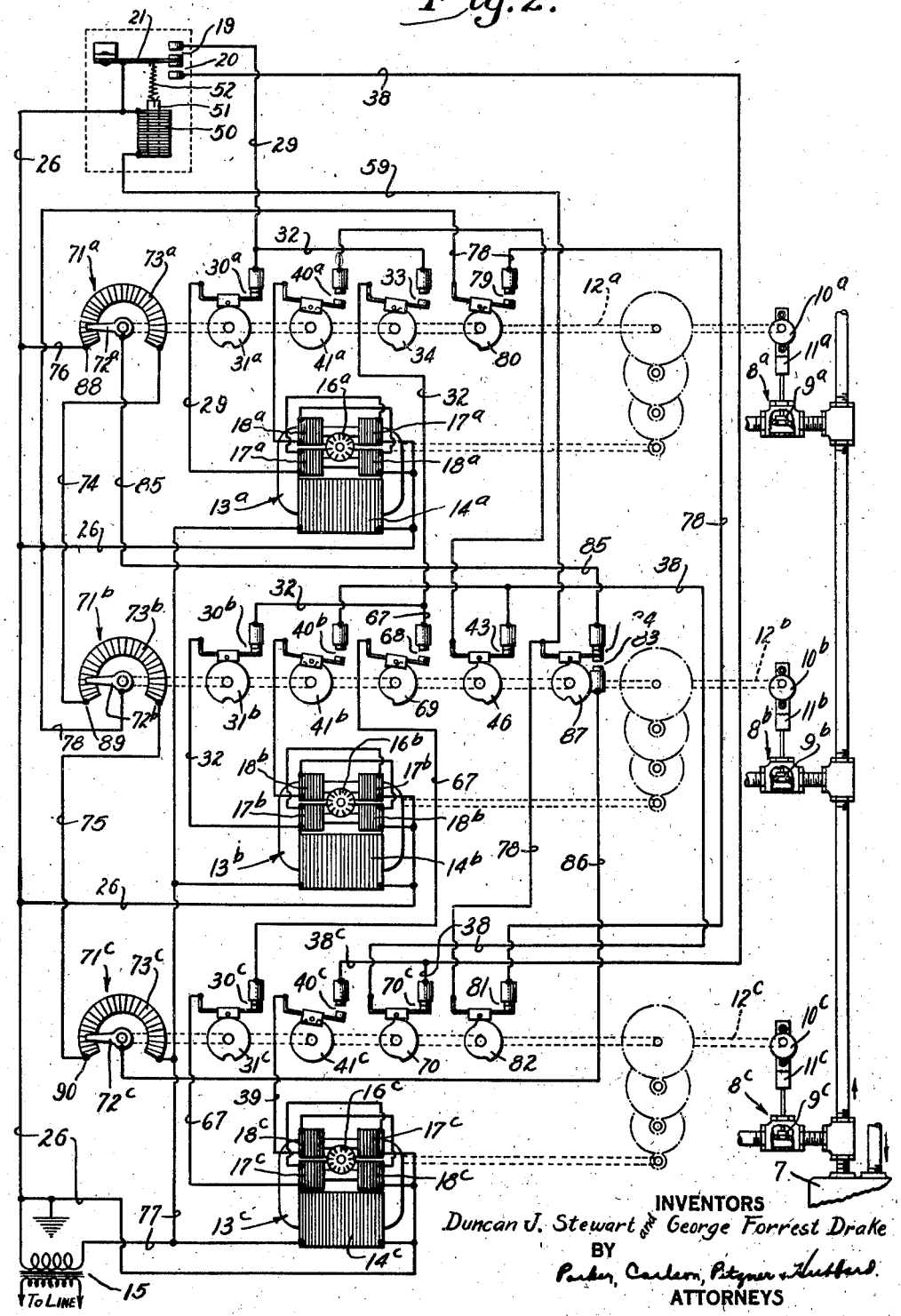
Fig. 2 is a schematic view and wiring diagram illustrating the adaptation of the present invention to a system employing a larger number of regulating devices.

In Fig. 2, the invention is embodied in a system in which the flow of the conditioning medium is governed by three valves $8^a$, $8^b$, and $8^c$. The same reference characters used in Fig. 1 are applied to the circuits and the parts of the operators for the valves $8^a$ and $8^b$ in Fig. 3, the corresponding parts of the operator for the valve $8^c$ being designated by reference characters to which the exponent $c$ is applied.

To provide for operation of the valve $8^c$ in proper sequence, a branch circuit from the conductor 32 is extended to the valve opening windings $17^c$ through a conductor 67 having therein a switch 68 which is closed by a cam 69 when the shaft $12^b$ is in fully open position and a limit switch $30^c$. The conductor 38, instead of extending from the switch $40^b$ directly to the thermostat switch 20, has interposed therein a switch $70^c$ which is allowed to open by a cam 70 on the shaft $12^c$ except when the valve $8^c$ is fully closed as shown. Branching from the conductor 38 is a conductor $38^c$ extending to the valve-closing windings $18^c$ through the limit switch $40^c$ of the operator for the valve $8^c$.

With the circuits thus arranged, the control will operate in the same manner as the one shown in Fig. 1, the valves $8^a$, $8^b$, and $8^c$ being opened successively in response to prolonged closure of the switch 19 and closed in reverse order when the switch 20 remains closed. If, for example, the valve $8^b$ is partially open, closure of the switch 19 will short-circuit the windings $17^b$ through the conductors 29 and 32 and the then closed switches $30^b$ and 33. In the partially open position of the valve $8^b$, the windings $18^b$ may be short-circuited by the switch 20 through the conductor 38 and the then closed switches $70^c$ and $40^b$. When the valve $8^b$ becomes fully opened, the control of the thermostat will be transferred to the motor $13^c$ by closure of the switch 68.

Progressive variation in the voltage applied to the solenoid 50 over the combined range of movement of the three successively operable valves is effected by three rheostats $71^a$, $71^b$, and $71^c$ having movable contact arms $72^a$, $72^b$, and $72^c$ fast on the valve operator shafts and engaging resistance elements $73^a$, $73^b$, and $73^c$ connected in series relation by conductors 74 and 75. The element $73^a$ is connected to the power source 15 by conductors 26 and 76, and the element $73^c$ is joined to this source by the conductor 77.

The respective contact arms $72^a$, $72^b$, and $72^c$ are connected to the solenoid winding 50 when the respective valves 8ª, 8ᵇ, and 8ᶜ are under the control of the room thermostat. To this end, the contact arm 72ᵇ is connected to conductor 59 through a conductor 78 including a switch 79 which is closed by a cam 80 on the shaft 12ª when the valve 8ª becomes fully opened and a second switch 81 which is maintained closed by a cam 82 on the shaft 12ᶜ except when the valve 8ᶜ is out of valve-closed position, both of these switches being closed when the valve 8ᵇ is within the control of the thermostat. The conductor 59 is joined to the common terminal of two switches 83 and 84, the latter leading through a conductor 85 to the contact arm 72ª, and the former being joined by a conductor 86 to the contact arm 72ᶜ. These switches are actuated by a cam 87 on the operating shaft 12ᵇ so shaped that the switch 84 will be held closed as shown when the valve 8ᵇ is closed, the valve 8ª then being in control of the thermostat. The switch 84 is allowed to open as the valve 8ᵇ moves away from closed position. The switch 83 is held open when the valve 8ᵇ is closed or partially open and is allowed to close as this valve becomes fully opened. With this arrangement, there will be an overlap between the closing of the switch 79 as the valve 8ª becomes fully open and opening of the switch 83 as the valve 8ᵇ starts to open. Similarly, there is an overlap between the closure of the switch 84 and opening of the switch 83. Thus, the solenoid 50 will always be connected to one or more of the rheostat arms and not allowed to become deenergized during the transfer of control from one rheostat to the next.

With the rheostats thus connected, the degree of energization of the solenoid 50 when the valve 8ª is partially open will be determined by the voltage drop across that portion of the resistance element 73ª between the terminal 88 and the arm 72ª, the voltage increasing progressively as the arm swings clockwise during opening of the valve 8ª. As an incident to full opening of the valve 8ª and the subsequent initial opening of the valve 8ᵇ, the switch 84 is opened and the switch 79 is closed thereby placing the solenoid under the control of the rheostat 71ᵇ without interrupting the solenoid circuit. Then, during modulation of the valve 8ᵇ, the solenoid energization is determined by the cumulative potential drop across the element 73ª and that portion of the element 73ᵇ between the terminal 89 and the arm 72ᵇ. Similarly, as a result of closure of the switch 83 as the valve 8ᵇ becomes fully open and the subsequent opening of the switch 81 in the initial opening movement of the valve 8ᶜ, the rheostat 71ᶜ is placed in control of the solenoid, the energization of which in any partially open position of the valve 8ᶜ is governed by the cumulative potential drop across the elements 73ª, 73ᵇ and that portion of the element 73ᶜ between the terminal 90 and the arm 72ᶜ. Therefore, since the contact arms 72ª, 72ᵇ, and 72ᶜ move clockwise across their resistance elements successively as the valves 8ª, 8ᵇ and 8ᶜ become opened, the voltage applied to the solenoid will increase progressively causing progressive lowering of the control point of the room thermostat. Likewise, a progressive decrease in the energization of the solenoid will occur as the valves close successively, the control point at any time corresponding to the cumulative opening of the valves.

Figure 5:
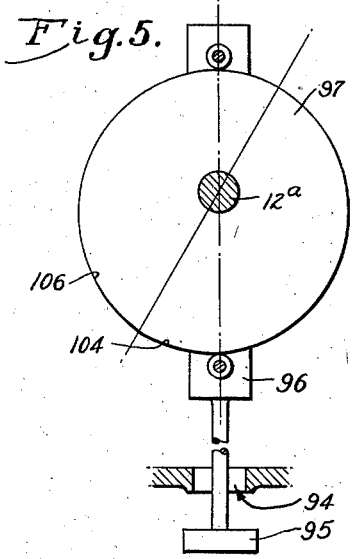
Fig. 5 is a fragmentary elevational view of a mechanism for actuating one of the regulating devices shown in Fig. 4.
Figure 6:
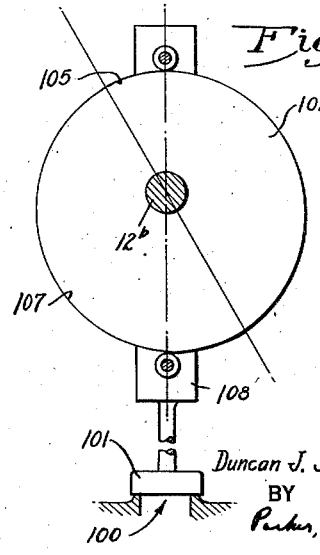
Fig. 6 is a similar view of the actuating mechanism for the other regulating device of Fig. 4.
Figure 4:
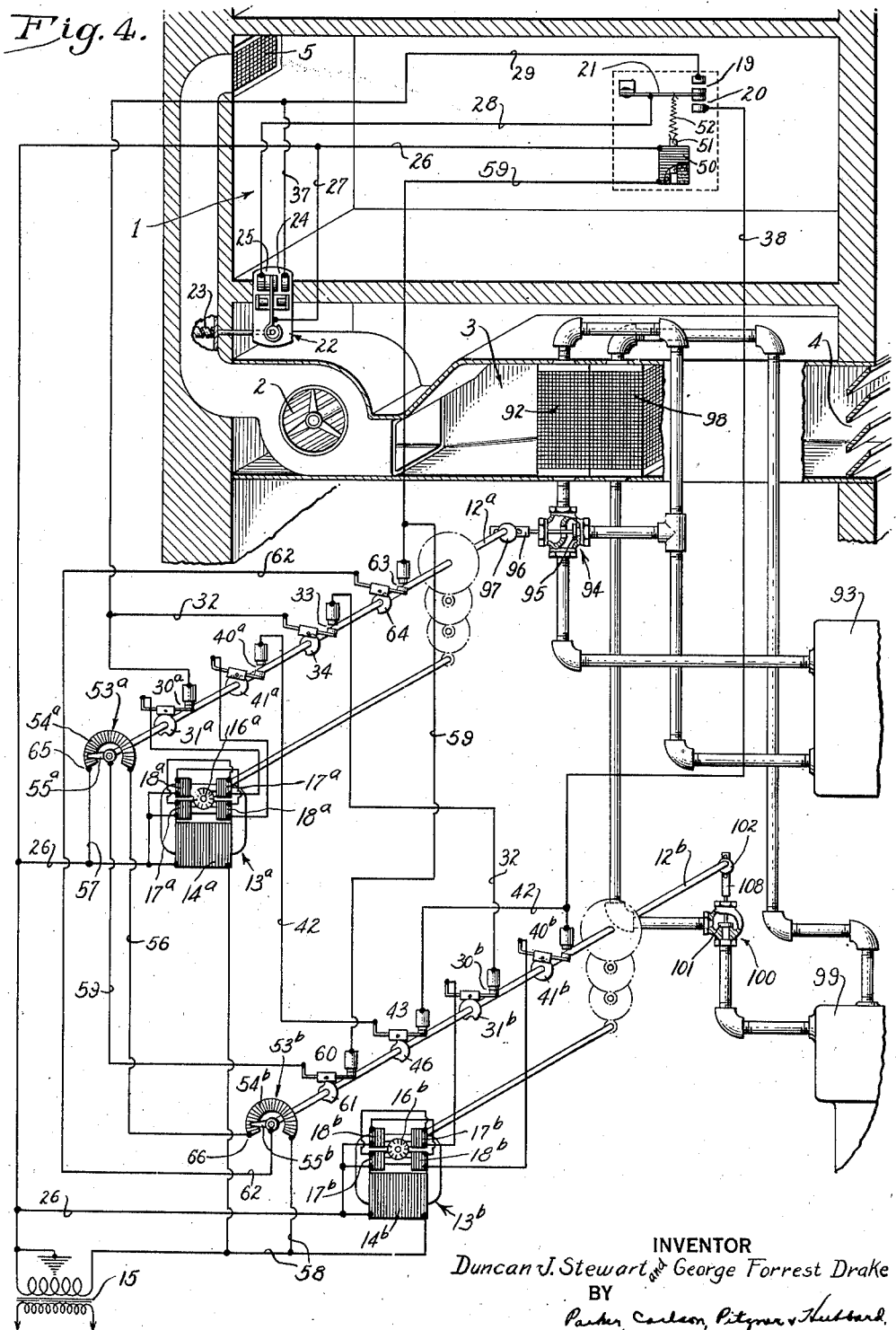
Fig. 4 illustrates the adaptation of the invention to a combined heating and cooling system.

Figs. 4, 5, and 6 illustrate an adaptation of the invention to the control of conditioning units of different kinds, provision being made for modulating the capacity of the different units through spaced ranges of variation of the condition being controlled. In this modification, one conditioning unit comprises a cooler in the form of a coil 92 arranged within the air duct 3 and adapted to be supplied with cooled medium from a suitable source indicated at 93. The flow of this medium to vary the capacity of the cooler is governed by a valve 94 having a movable member 95 connected to a follower 96 which is actuated by a cam 97 on the shaft 12ª of one of the valve operators previously described. The other conditioning unit comprises a coil 98 within the duct 3 supplied with heated fluid from a source 99 under the control of a valve 100. The member 101 of the latter is actuated by a cam 102 fast on the shaft 12ᵇ and acting on a follower 103.

To provide for modulation of the cooling and heating capacity of the conditioning system through spaced ranges of variation in the space temperature while maintaining both units 92 and 98 ineffectual at the intervening temperatures, one or both of the cams 97 and 102 are formed with dwell surfaces 104 and 105 adjacent the active surfaces 106 and 107 so as to provide a limited amount of lost motion between the shafts 12ª and 12ᵇ and the valve members 95 and 101. In the case of the cam 97, the dwell surface is effective after the shaft 12ª has turned in a clockwise direction through nearly a half revolution, the dwell operating after complete closure of the valve 94 to permit of continued rotation of the shaft. The cam 102 is shaped so that the dwell 105 is effective in the initial clockwise movement of the shaft 12ᵇ from the position shown after which the valve 100 is opened progressively until the limit position of the shaft is reached.

The construction and operation of the control mechanism in so far as positioning of the shafts 12ª and 12ᵇ is concerned is identical with that of the control shown in Figure 1. Accordingly, the parts of the thermostats and valve operators are numbered to correspond to Figure 1.

Operation of the system shown in Fig. 4 is as follows assuming that the room temperature is above seventy-five degrees and that the total range of shift of the control point of the thermostat is from seventy to seventy-five degrees, the cooler valve 94 being modulated as the temperature changes between 73 and 75 degrees and the heater valve 100 being opened varying degrees as the temperature varies from 70 to 72 degrees. Under the assumed conditions, the parts would be positioned as shown in Figs. 4, 5, and 6, the cooler operating at full capacity and the heater being inoperative. If now the room temperature drops below seventy-five degrees, the room thermostat switch 19 will close thereby short-circuiting the shading coils 17ª and starting the motor 13ª in a direction to turn the shaft 12ª clockwise initiating closure of the valve 94. The capacity of the cooler is thus decreased progressively until the position of the valve member 95 corresponds to the decreased temperature. At this time, the energization of the solenoid 50 will have been increased by operation of the rheostat 53ª until the switch 19 is opened.

Similar operations will occur in response to further temperature falls, the valve 94 becoming fully closed at 73 degrees. If the temperature continues to fall, clockwise movement of the shaft 12ª will continue independently of the valve member 95 as permitted by the dwell surface 104, the shaft 12ª reaching its limit position at a temperature of 72.5 degrees. In the approach to this position, the switch 33 will be closed and the limit switch 30ᵃ will be opened thereby transferring the control by the room thermostat switch 19 to the motor 13ᵇ.

Assume now that the room temperature falls below 72.5 degrees and continues to 71.5 degrees. The resulting closure of the thermostat switch 19 short-circuits the shading coils 17ᵇ through switches 33 and 30ᵇ thereby starting the motor 13ᵇ to turn the shaft 12ᵇ clockwise. In the initial part of this movement, the dwell surface 105 is effective to hold the valve 101 closed. After the lost motion has been taken up, the valve 101 will start to open. At a position of the shaft 12ᵇ corresponding to 71.5 degrees, the energization of the solenoid 50 will have been increased sufficiently to open the switch 19 thereby stopping the motor. In response to further falls in temperature, the valve 101 will be opened progressively in a similar manner until its limit open position is reached at a room temperature of 70 degrees.

The reverse operation of the valves occurs as the room temperature increases. From 70 to 72 degrees, the heater valve 101 is closed progressively, its position being modulated back and forth in proportion to temperature changes within this range. Between 72 and 73 degrees, both valves will be held closed, the heater and cooler being maintained ineffectual. Within this range, however, the shafts 12ᵃ and 12ᵇ will oscillate back and forth with the temperature changes as permitted by the dwell surfaces 104 and 105. The control by the room thermostat will be transferred from the motor 13ᵃ to the motor 13ᵇ as the room temperature falls below 72.5 degrees and from the motor 13ᵇ to the motor 13ᵃ as the room temperature rises above this value. In response to a rise in the room temperature above 73 degrees, the cooler valve 94 will start to open and will be oscillated back and forth in proportion to the temperature changes within the range from 73 to 75 degrees.

It will be apparent from the foregoing that with the arrangement shown in Fig. 4, the control by the room thermostat is transferred back and forth between the heater and cooler automatically according to changes in the room temperature and that while either unit is active, its capacity will be modulated in accordance with temperature changes within a predetermined range. Accordingly, the control provides for automatic year-round operation of a combined heating and cooling system. The spacing of the temperature ranges at which the heater and cooler are effective may, of course, be changed as desired by varying the lengths of the dwell surfaces 104 and 105. If desired, the magnitude of the temperature range during which the heater and cooler are maintained ineffective may be governed by a dwell surface on only one of the cams.

This application is a continuation in part of our copending application Serial No. 122,804, filed January 28, 1937.

We claim as our invention:

1. In an air conditioning system, the combination of a plurality of valves having members controlling the flow of a conditioning medium comprising, in combination, a control instrument having a condition responsive element, means controlled by said instrument for opening said valve members successively and closing the same in reverse order while permitting modulating movements of any member under the control of the instrument, an electrical device for modifying the action of said instrument by exerting on said element a force which varies according to the degree of energization of the device, and means for increasing and decreasing the degree of energization of said device through the range of combined movements of said members in opposite directions whereby to establish a degree of energization proportional to the combined degree of opening of all of said valves.

2. In combination with a plurality of regulating members, a control instrument having a movable condition responsive element, means controlled by said instrument for moving said members successively in one direction in response to condition changes in one direction and in the opposite direction but in reverse order in response to reverse condition changes, while permitting modulating movements of any member in response to condition changes occurring during control thereof by the instrument, an electrical device exerting a mechanical force on said element for modifying the action thereof, and means to variably energize said device including a plurality of voltage regulators acting jointly to govern the energization of said device and individually actuated in response to the movements of the respective regulating members.

3. In combination with a plurality of regulating members, a condition responsive control instrument, means controlled by said instrument for moving said members successively in one direction in response to condition changes in one direction and in the opposite direction but in reverse order with reverse condition changes, while permitting modulating movements of any member during control thereof by the instrument, an electrical device associated with said instrument for modifying the action thereof, and means to variably energize said device including a plurality of potential dividing rheostats having contact elements movable in unison with the respective members, and switching means operating to associate the movable element of respective rheostats with said device during the times when the respective regulating members are under the control of said instrument.

4. In an air conditioning system, the combination with a pair of regulating members movable back and forth between limit positions, a control instrument, means governed thereby to cause movement of said members successively from said one limit position to the other, an electrical device for modifying the action of said instrument according to the degree of energization of the device, and means for variably controlling the energization of said device including a pair of resistance elements one for each of said members connected in series relation with one of the elements connected to said device, a pair of contacts each movable across one of said resistance elements during the movement of one of said members from one limit position to the other, and switching means responsive to the movements of said members and operating to connect one of said contacts with said device when one of said members reaches one limit position and to disconnect the other contact from said device when the other member moves away from its other limit position.

5. In an air conditioning system, the combination with three regulating members movable back and forth between limit positions, a control instrument, means governed thereby to cause movement of said members successively from one limit position to the other, an electrical device for modifying the action of said instrument according to the degree of energization of the device, and means for variably controlling the energization of said device including three resistance elements one for each of said members connected in series relation with one of the terminal elements connected to said device, three contacts each movable across one of said resistance elements during the movement of one of said members from one limit position to the other, switching means responsive to the movements of said members and operating to connect said device to the contact of the intermediate member when one of the terminal members is in one position and the other terminal member is in the other limit position, and switching means to connect said device to the other contacts when said intermediate member is in opposite limit positions respectively.

6. A control system for opening and closing at least three valve members having, in combination, an instrument responsive to a condition to be controlled, means controlled by said instrument for opening said valve members successively and closing the same in reverse order while modulating the movements of the partially open member, an electrical device associated with said instrument and adapted according to its degree of energization to vary the control point of the instrument progressively, a plurality of resistance elements one for each of said valve members connected in series relation across a source of current, contact arms for varying the values of the respective resistances movable in unison with the respective valve members, switching means connecting the contact arm associated with the second valve member to said device when the first valve member is in open position and the third valve member is in closed position, and switching means responsive to the movements of said second valve member to connect the contact arm of the first valve member to said device when the second valve member is closed and to connect said device to the contact arm of the third valve member when said second valve member becomes fully open.

7. In a system of the character described, the combination of a group of regulating members including two terminal members and at least one intermediate member, a control instrument governing the movements of said members to vary the condition controlled thereby over a range corresponging to the combined range of movement of the members, an electrical device associated with said instrument to modify the control point thereof in accordance with the degree of energization of the device, two terminal and at least one intermediate voltage regulators respectively actuated in unison with the movements of the corresponding regulating members, means responsive to the movements of said intermediate regulating member to associate one or the other of said terminal regulators with said device, and means responsive to the movements of said terminal members to associate said intermediate regulator with said device.

8. The combination of a plurality of conditioning mechanisms, a condition responsive instrument governing the successive operation of said mechanisms to progressively modulate the combined conditioning capacity of the group of mechanisms, an independent power operated device associated with said instrument and exerting a variable force thereon for controlling the effective control point thereof, and means operating automatically to vary the magnitude of said force with changes in the combined capacity of said mechanisms and thus establish a control point of the instrument corresponding to the prevailing capacity of the group.

9. In combination with a plurality of regulating members, a condition responsive control instrument, means controlled by said instrument for moving said members successively in one direction in response to a condition deviation in one direction and in the opposite direction but in reverse order when the condition changes in the reverse direction, while permitting modulating movements of any member during control thereof by the instrument, an electrical device associated with said instrument for modifying the action thereof, and means to variably energize said device including a pair of resistance elements each having one terminal connected to a voltage source, contact arms respectively connected electrically to the terminals of said device and engageable with different parts of the respective elements, said arms and the associated elements being movable relative to each other in unison with the respective members, and a fixed resistance having terminals connected respectively to the other terminals of said elements and determining the minimum voltage applied to said device.

10. In combination with a pair of regulating members each movable between two corresponding limit positions, an instrument controlling the movements of said members to cause successive movement thereof in opposite directions but in reverse order, an electrical device associated with said instrument for modifying the action thereof, and means to variably energize said device including a pair of contact arms movable in unison with the respective members, resistance elements engaged by the respective arms throughout the range of movements of said members and connected in series relation, one terminal of said device being connected to the remote terminal of one of said elements, branch conductors extending from the other terminal of said device to the respective contact arms and each including a switch, and means for actuating the switch associated with each contact arm in response to movement of the member that moves with the other arm, said switches operating upon movement of one member to one limit position and movement of the other member away from the other limit position to transfer the control of said device from one of said arms to the other.

11. In combination with a pair of regulating members each movable between two corresponding limit positions, an instrument controlling the movements of said members to cause successive movement thereof in opposite directions but in reverse order, an electrical device associated with said instrument for modifying the action thereof, and means to variably energize said device including a pair of contact arms movable in unison with the respective members, resistance elements engaged by the respective arms throughout the range of movements of said members and connected in series relation, one terminal of said device being connected to the remote terminal of one of said elements, branch conductors extending from the other terminal of said device to the respective contact arms and each including a switch, and means for closing one switch in response to the movement of one of said members to one of said limit positions and opening the other switch as the other member subsequently moves away from one limit position.

12. A control system for regulating a condition to be controlled having, in combination, a plurality of actuating members, a corresponding number of condition regulating members, individual power driven operators for imparting modulating movements to the respective members, a control mechanism including an element movable in opposite directions during opposite changes of said condition, and devices respectively actuated by movement of said element in response to opposite deviations of said condition from the effective control point of said mechanism, means controlled by said devices and controlling said operators one at a time to modulate the position of the associated actuating member, means operable to shift the control point of said control mechanism progressively in accordance with the cumulative movements of said actuating members, and mechanisms actuated by said actuating members and operating the corresponding regulating members to modulate the positions thereof during different portions of the range of shift of said control point while maintaining substantially fixed positions of said regulating members while said condition is changing through an intermediate portion of said range.

13. A condition controlled system having, in combination, a plurality of actuating devices, individual power driven operators for imparting modulating movements to the respective devices, a single condition responsive means controlling said operators, an electrical means operable to modify the action of said condition responsive means by exerting thereon a force varied progressively in accordance with the cumulative movements of said devices, and regulating members modulated by the respective devices during different spaced portions of the range of action of said condition responsive means.

14. A temperature control system having, in combination with a cooler and a heater arranged to cool and heat a medium to be conditioned, independently movable regulating devices respectively operable to modulate the heating capacity of said heater and the cooling capacity of said cooler, a thermostat responsive to temperature changes of said medium and normally in active control of both of said devices and means responsive to the movements of each of said devices and coacting with said thermostat to modulate the movements of one of said regulating devices during variation of the medium temperature through one range and modulation of the other regulating device during variation of the medium temperature through a different range.

15. A temperature control system having in combination with a cooler and a heater arranged to cool and heat a medium to be conditioned, independently movable regulating devices respectively operable in accordance with their positions to modulate effects of said heater and cooler, individual power operators for said heating and cooling devices, a thermostatic element responsive to temperature changes of said medium and continuously in active control of both of said operators, and means jointly responsive to the movements of each of said devices and of said element and controlling said operators to modulate the movements of said regulating devices successively to decrease the heating effect of said heater progressively to a minimum during a rise in the temperature of said medium through one range, to maintain said heater and cooler substantially ineffectual during a continued temperature rise through a second range and to increase the cooling effect of said cooler progressively during a further temperature rise.

16. A temperature control system having, in combination with a cooler and a heater arranged to cool and heat a medium to be conditioned, independently movable regulating devices for modulating the heating capacity of said heater and the cooling capacity of said cooler, a single thermostatic instrument responsive to temperature changes of said medium and continuously in active control of both of said devices, and means controlled by said instrument and operating to modulate the movements of one of said regulating devices to decrease the capacity of said heater progressively as the medium temperature increases through a predetermined range and to increase the cooling effect of said cooler progressively as the medium temperature rises through a predetermined range spaced above said first range so as to provide an intermediate temperature range at which both said heater and cooler are substantially ineffectual.

17. A control system for regulating a condition to be controlled having, in combination, a plurality of condition regulating devices, individual power driven operators for imparting modulating movements of variable lengths to the respective devices, a control element movable in opposite directions with opposite changes in said condition, a plurality of voltage regulators acting jointly to produce a cumulative voltage and having individual control members movable in unison with the movements of the respective regulating devices, and electrical mechanism controlled jointly by said cumulative voltage and the movements of said condition responsive element and said regulating devices and controlling said operators one at a time to cause movement of said devices successively in one direction during a progressive condition change through a predetemined range and modulation of the devices in reverse order during a reverse condition change through such range.

18. A system for proportioning the movements of a plurality of condition regulating members to correspond to condition changes within a predetermined range, said system having, in combination, individual power driven operators for imparting modulating movements of variable lengths to the respective regulating members, an instrument including an element movable in opposite directions with opposite changes in said condition, and mechanism controlled jointly by said condition responsive element and by the cumulative movements of said regulating members to place said operators in control of said instrument one at a time and cause movement of said members successively in one direction during a progressive condition change through said predetermined range and be modulated in reverse order during a reverse condition change through such range.

19. A system for proportioning the movements of a plurality of condition regulating members to correspond to condition changes within a predetermined range, said system having, in combination, individual power driven operators for imparting modulating movements of variable lengths to the respective regulating members, an instrument including an element movable in opposite directions with opposite changes in said condition, a power actuated device exerting a force on said element to vary the effective control point of the instrument in accordance with the magnitude of such force, means for governing said device to vary said force progressively with the cumulative movements of said members, and mechanism controlled by said instrument and the movements of said members to place said operators in control of the instrument one at a time and cause movement of the members successively in one direction during a progressive condition change through said predetermined range and modulation of the members in reverse order during a reverse condition change through such range.

DUNCAN J. STEWART.
GEORGE FORREST DRAKE.